No. 766,994. PATENTED AUG. 9, 1904.
B. S. FRYAR.
REFRIGERATOR BOX.
APPLICATION FILED MAR. 17, 1904.
NO MODEL. 2 SHEETS—SHEET 2.
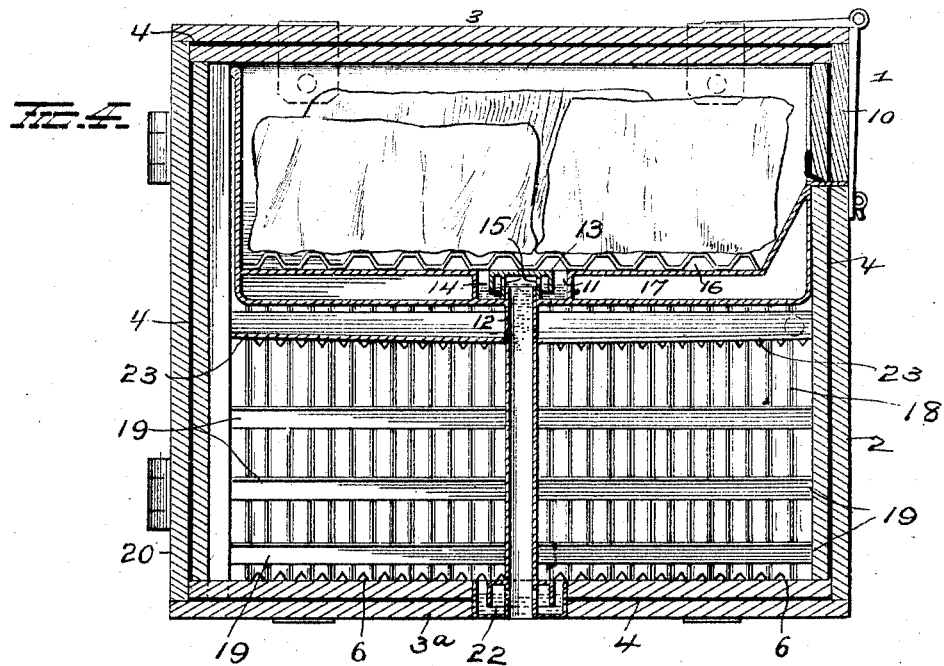
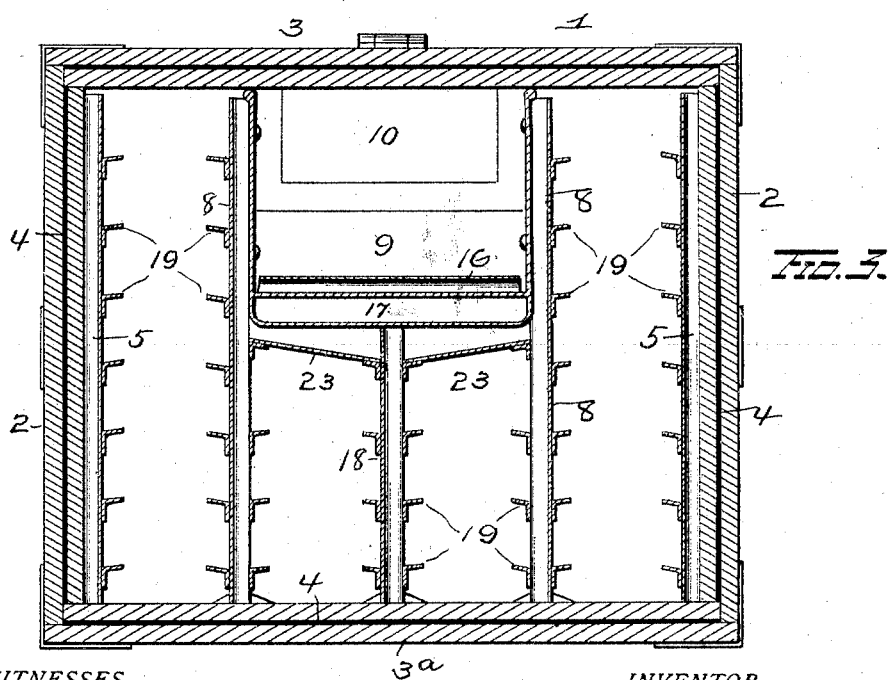
WITNESSES
E. J. Nottingham
G. F. Downing
INVENTOR
B. S. Fryar
By H. A. Seymour
Attorney

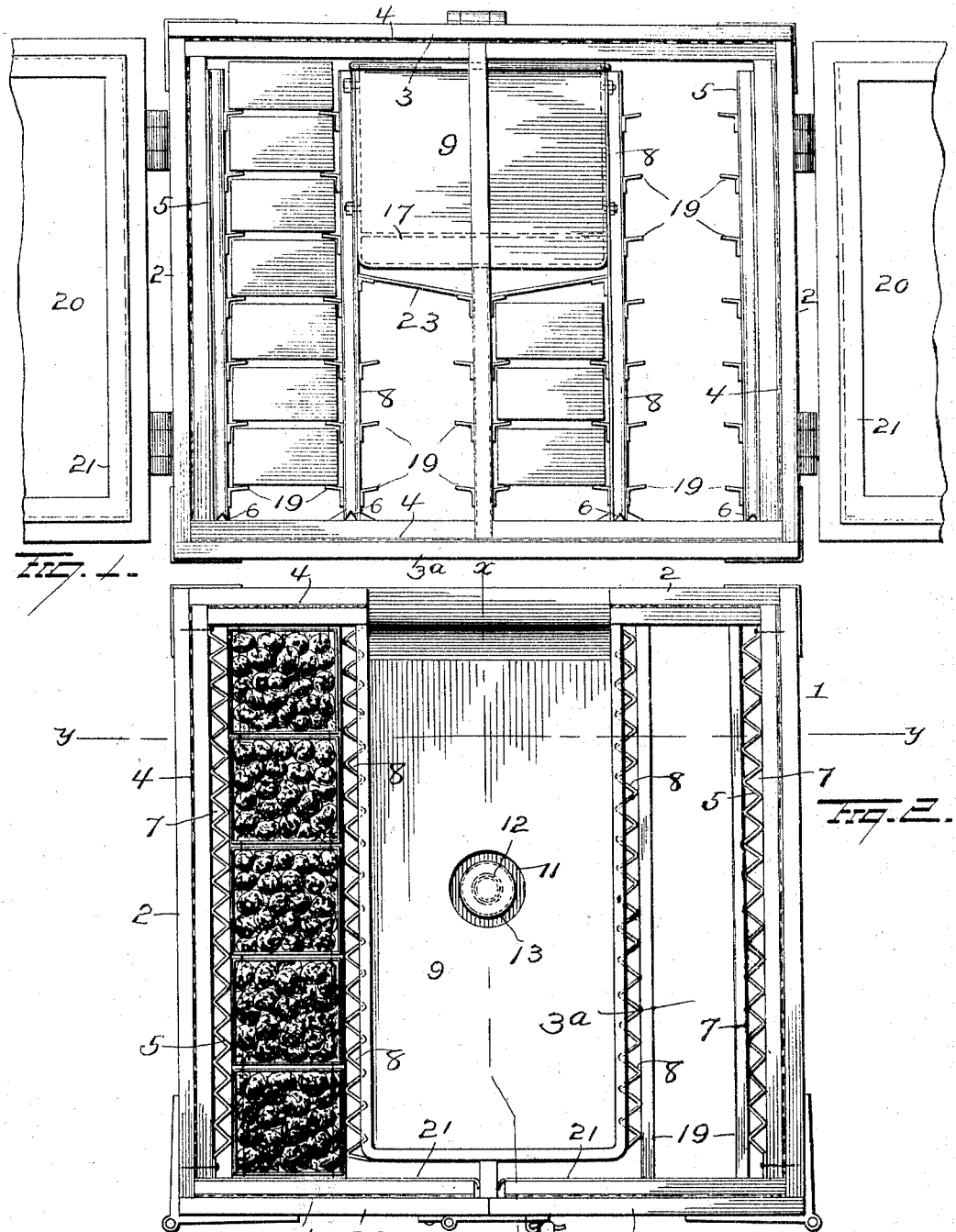

No. 766,994. Patented August 9, 1904.

UNITED STATES PATENT OFFICE.

BYRON S. FRYAR, OF SUMNER, WASHINGTON.

REFRIGERATOR-BOX.

SPECIFICATION forming part of Letters Patent No. 766,994, dated August 9, 1904.

Application filed March 17, 1904. Serial No. 198,613. (No model.)

*To all whom it may concern:*

Be it known that I, BYRON S. FRYAR, of Sumner, in the county of Pierce and State of Washington, have invented certain new and useful Improvements in Refrigerator-Boxes; and I do hereby declare the following to be a full, clear, and exact description of the invention, such as will enable others skilled in the art to which it appertains to make and use the same.

My invention relates to improvements in refrigerator-boxes such as are employed for transporting fruit and similar perishable goods, the object of the invention being to so construct such a refrigerator-box that the supply of ice can be readily replenished during transit without in any manner interfering with or disturbing the fruit or other perishable goods being shipped.

A further object is to construct a refrigerator shipping-box in such manner that in case of leakage the juice from the fruit in one part of the box will not be deposited upon fruit in another part.

A further object is to provide a shipping-refrigerator with means to permit boxes of fruit to be stored therein one above another and so that one box will not come into contact with the fruit in the box below it, said means also serving to direct juice which may escape from one box away from the fruit in a lower box.

A further object is to construct a shipping-refrigerator in such manner as to economize space therein and permit the close packing of boxes of fruit without interference with each other, to provide for ample circulation of air, and to utilize the devices which provide for the circulation of air to support the goods being shipped.

A further object is to protect the fruit or other goods from moisture due to condensation.

With these objects in view the invention consists in certain novel features of construction and combinations and arrangements of parts, as will be hereinafter more fully described, and pointed out in the claims.

In the accompanying drawings, Figure 1 is a front view of a refrigerator embodying my improvements with the doors open. Fig. 2 is a plan view with the top removed. Fig. 3 is a transverse section on the line $y\ y$ of Fig. 2, and Fig. 4 is a view in longitudinal section on the line $x\ x$ of Fig. 2.

1 represents the refrigerator box or casing, the various sides 2 2, top 3, and bottom $3^a$ of which each comprises two walls separated by sheets of felt or similar material 4. Sheets 5 of corrugated metal are located within the refrigerator-box and secured to the sides thereof, said sheets extending from the bottom to the top of the box and having notches 6 in its upper and lower edges to permit the free entrance of air to the vertical ducts 7, formed by the corrugations. Similar corrugated sheets 8 are disposed vertically within the box and spaced a short distance from the corrugated sheets 5.

Between the corrugated sheets 8 an ice-receptacle 9 is located and securely fastened to said sheets 8 and to the rear wall of the box. This ice-receptacle 9 is accessible for the insertion of ice through a door 10 in the back of the refrigerator. The center of the ice-receptacle is made with a depressed chamber 11, and into this chamber the upper end of a drip-pipe 12 projects. The upper end of the drip-pipe, which projects into the depressed chamber 11, is covered by a cap 13, supported on the drip-pipe by means of a sleeve 14, secured to the cap and telescoping over the upper end of the drip-pipe, water from the depressed chamber 11 being permitted to enter the drip-pipe through openings 15 in the upper end of the sleeve 14. This construction provides a trap which will prevent the clogging of the drip-pipe with sawdust from the ice and prevent the escape of cold air from the refrigerator and the entrance of warm air thereinto.

The drip-pipe has its exit through the bottom of the refrigerator, and a trap 22 is provided in the bottom of the refrigerator to permit the exit of condensation which might accumulate in the bottom of the refrigerator and also to assist in preventing the escape of cold air and the entrance of warm air. The trap in the ice-box is protected to a considerable extent from clogging by a corrugated sheet 16, upon which the ice rests.

The bottom of the ice-receptacle 9 is made with a dead-air compartment 17 to prevent moisture from condensing on the bottom of the ice-receptacle and dripping upon the fruit below the same. A corrugated sheet 18 extends from the bottom of the refrigerator upwardly to a point in proximity to the bottom of the ice-box and equidistant from the corrugated sheets 8. To each corrugated sheet several supports 19 are secured and spaced a suitable distance apart, the supports on one sheet being located in the same planes as the supports on the adjacent sheets, so as to cooperate with each other to form supports for tiers of fruit receptacles or boxes. Each support consists of a strip angular in cross-section and having its vertical member secured to the corrugations of one of the corrugated sheets. The horizontal members of the supports serve to receive fruit-boxes and to conduct any drippings therefrom to the channels formed by the corrugated sheets and away from the contents of the lower boxes. Said supports also serve to separate the boxes of one tier from those of the other tiers, and thus avoid the necessity of piling the fruit-boxes one upon another, and at the same time said supports permit a circulation of air above and below each box. The supports at the upper end of central corrugated sheet 18 and two supports on the sheets 8 8 support inclined plates 23, arranged to form a trough which will discharge the condensed moisture into the ducts formed by the corrugated sheet 18.

By the provision of the corrugated sheets notched at their upper and lower ends ample circulation of air will be afforded and by arranging two of these sheets alongside and in contact with the ice-receptacle and another of said sheets immediately under the ice-receptacle the air passing through the ducts formed by these corrugated sheets will be thoroughly and effectually cooled.

The boxes of fruit will be inserted into the front end of the refrigerator, after which the latter can be permanently closed by doors 20 and said doors then locked. As means are provided for replenishing the ice without disturbing the goods stored in the refrigerator, the doors 20 can remain permanently locked during the entire time the refrigerator is in transit. The doors 20 may be provided with suitable packing 21 to prevent the escape of cold air and the entrance of warm air.

It is evident that changes in the construction and relative arrangement of the several parts might be made without evading my invention, and hence I would have it understood that I do not restrict myself to the particular construction and arrangement of parts shown and described; but, Having fully described my invention, what I claim as new, and desire to secure by Letters Patent, is—

1. The combination with a refrigerator-box having an inlet for goods in one end and an ice-inlet at the other end, of an ice-receptacle communicating with said ice-inlet, corrugated sheets secured to the sides of said ice-receptacle, similar corrugated sheets secured to the sides of the box, and supports secured to said corrugated sheets for the reception of goods.

2. The combination with a box, of two pairs of corrugated sheets, an ice-receptacle between said pairs of corrugated sheets, and in contact with one sheet of each pair, and supports secured to said sheets.

3. The combination with a box, of two pairs of corrugated sheets, the sheets of each pair spaced apart, supports secured to said corrugated sheets, an ice-receptacle disposed between the pairs of corrugated sheets, a corrugated sheet between the bottom of the ice-receptacle and the bottom of the box and supports secured to both sides of said last-mentioned corrugated sheet.

4. The combination with a box and an ice-receptacle therein, a trap in the bottom of said ice-receptacle, a drip-pipe extending from said trap to the outside of the box, a trap in the bottom of the box communicating with said pipe and with the interior of the box, supports for goods at the sides of the ice-receptacle, means for permitting circulation of air about the goods on said supports, doors for permitting access to said supports and an independent door for permitting access to the ice-receptacle.

5. The combination with a box and an ice-receptacle therein, of a series of corrugated sheets located in said box, each sheet notched at its ends to permit the passage of air through the corrugations and supports for goods secured to said sheets transversely of the corrugations.

In testimony whereof I have signed this specification in the presence of two subscribing witnesses.

BYRON S. FRYAR.

Witnesses:
 G. C. SPENCER,
 H. J. TRUBSHAW.